Sept. 8, 1942.   F. E. PAYNE ET AL   2,295,521
PISTON HEAD ASSEMBLY
Filed Nov. 7, 1940   2 Sheets-Sheet 1

INVENTORS.
Frank E. Payne
and Thomas L. Gatke

Witness:
Chas. L. Koursh   Chritton, Wiles, Davies, Hirschl & Dawson, Attys.

Sept. 8, 1942.  F. E. PAYNE ET AL  2,295,521
PISTON HEAD ASSEMBLY
Filed Nov. 7, 1940    2 Sheets-Sheet 2

INVENTORS.
Frank E. Payne,
Thomas L. Gatke

Patented Sept. 8, 1942

2,295,521

UNITED STATES PATENT OFFICE 2,295,521

PISTON HEAD ASSEMBLY

Frank E. Payne, Glencoe, and Thomas L. Gatke, Oak Park, Ill.

Application November 7, 1940, Serial No. 364,722

4 Claims. (Cl. 309—4)

This invention relates to improvements in piston head assemblies.

It has been proposed heretofore to provide pistons with metal rings sprung into circumferential grooves in the cylindrical surface of the piston. In some cases, except for an annular shoulder at one end, the piston has a diameter considerably less than the cylinder in which it reciprocates and has also at the other end a detachable plate or ring which permits retaining rings or spacing rings to be slipped over said piston and confined between the two shoulders provided, each spacing ring being surrounded loosely by a metal piston ring, which arrangement avoids the necessity of expanding the piston rings to spring them into the annular grooves.

Pistons of these types are subject to the disadvantage that the reciprocating metal parts cause scoring of the inner metal wall of the cylinder or of the cylinder liner. Also, where attempts have been made to overcome this difficulty by using fabric packing rings such as duck, braided flax, wicking and the like, with or without rubber, as a substitute for metal piston rings, the clearances between the piston heads and the cylinder have to be fairly small to prevent disintegration of and extrusion of small particles of the packing through the clearance spaces into the cylinder. Following the loss of packing ring material the metal surfaces begin to engage each other during part of each stroke at least, and particularly when high pressures are used, the reaction causing the piston to develop a powerful lateral thrust which results in scoring or gouging the cylinder liner.

The general object of the present invention is to overcome this and other difficulties by providing a piston head assembly in which the sealing rings which slide back and forth against the cylinder liner consist of hard, low friction material which does not score, and in which assembly a series of said sealing rings is employed, separated from each other by individual spacer rings made of non-scoring material and of less diameter than said sealing rings.

Another object is to provide a sufficient number of such alternate rings and spacers on the end of a piston rod so that when the nut is tightened against the end of the plate, the various parts of the assembly are all clamped together sufficiently to form a substantially rigid piston, except that said sealing rings may adjust themselves laterally despite the clamping action.

A further object is to provide a piston assembly consisting of alternate spacer rings and guide rings, with sealing rings surrounding the spacing rings, and all made of hard, low friction material, preferably laminated material with a phenol condensation product binder.

An additional object is to provide an assembly of this character in which the side by side annular members are maintained out of contact with each other by separators or washers made of material other than the material of which said annular members are composed, metal being an illustration of such material.

In the accompanying drawings two embodiments of the invention are illustrated.

Figure 1:
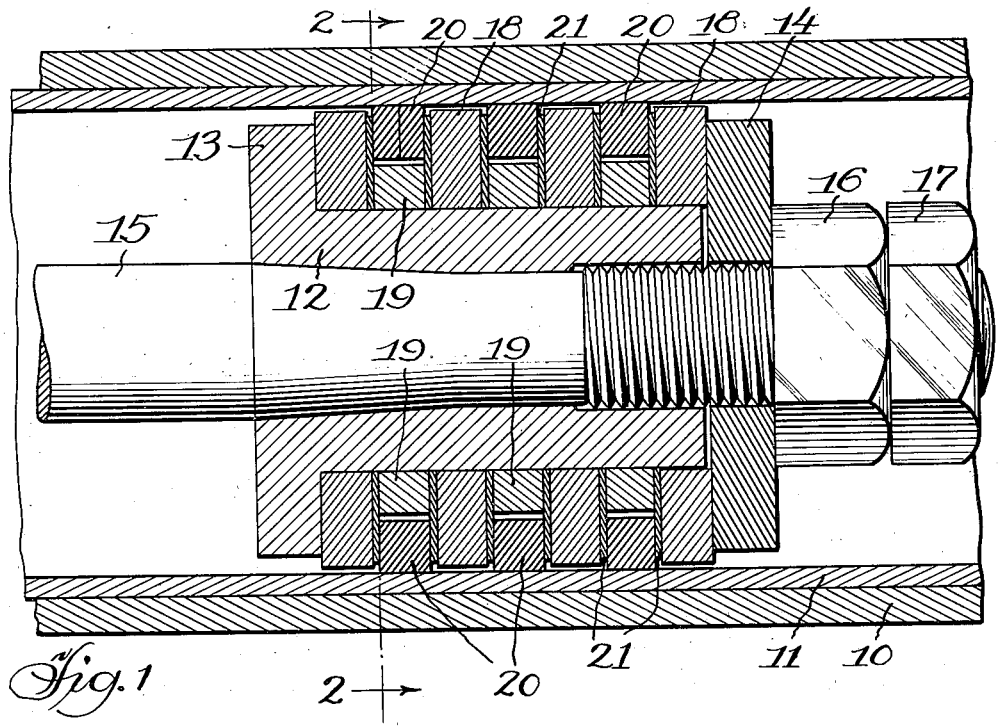
Fig. 1 is a sectional view of the piston and of part of the cylinder.
Figure 2:
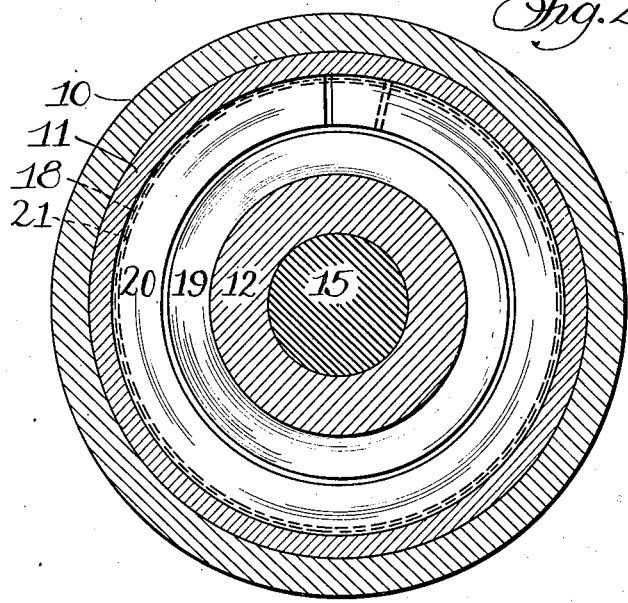
Fig. 2 is a section on the line 2—2 of Fig. 1.

In Fig. 1, a fragmentary part of a conventional cylinder 10 is shown which may be the cylinder of a steam engine or of a pump for water, oil or other liquids. Said cylinder may have a conventional liner 11.

The piston is in the form of a cylindrical sleeve 12 having an annular abutment 13 at one end and a removable ring or end plate 14 adjustably mounted on the end of the piston rod 15 by means of a nut 16 and a lock nut 17.

The end plate 14 may be made of cast iron or for some classes of service, of brass, and the annular abutments 13 and 14 at opposite ends have a diameter considerably less than the inside diameter of the liner.

Figure 3:
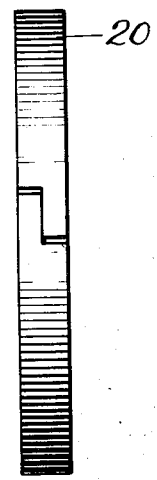
Fig. 3 is a side elevation of a sealing ring.

The piston assembly is built up by a series of what may be called guide rings 18 of a diameter slightly less than the inside diameter of the liner, with spacing rings 19 between said guide rings. These spacing rings are of considerably less diameter than the guide rings, as shown in Fig. 1, thus providing a series of circumferential grooves in which the sealing rings 20 are positioned. These sealing rings, as shown in Fig. 3 are incomplete rings or split rings having step cut joint ends to complete the seal, or diagonal joints.

The guide rings 18 are made preferably of laminated material combined with a phenol condensation product or synthetic resin, as a binder (one form of this composition being commercially known as Bakelite) thus forming a hard product with hard, smooth, low friction surfaces. The spacing rings 19 may be made of similar material.

The sealing rings 20 are also made preferably of similar material, i. e. having a hard, smooth, low friction surface to slide back and forth against the inner surface of the liner. Said sealing rings are formed normally with an outside diameter greater than the inside diameter of the liner so that said sealing rings, which are somewhat resilient, have to be contracted circumferentially to reduce their diameter when the piston is slid into the liner of the cylinder. Thus these sealing rings are maintained under compression, as a result of which they tend to expand outwardly and maintain themselves in contact with the liner 11 by outward pressure. Said sealing rings are preferably the same thickness as said spacer rings and surround the latter, having a loose fit which permits lateral movement of the sealing ring with respect to the longitudinal axis of the piston rod.

Each pair of rings, consisting of an inner spacing ring 19 and an outer sealing ring 20, considered as a unit, is spaced from the adjacent guide ring 18 by suitable separators or washers 21 which have a diameter less than said guide rings. These washers may be made of any suitable material, preferably something other than the synthetic resin compositions with which they are in contact. Any one of a number of non-rusting metals may be used for this purpose such, for example, as stainless steel or, in some cases, bronze.

When the parts are assembled and the nut 16 is tightened to clamp the end plate against the assembled annular members, a firm, rigid construction results, despite which the sealing rings may slide back and forth readily at right angles to the piston rod, where such movement is necessary during the reciprocations of the piston and the side thrusts thereon.

In practice the sealing rings fit the annular grooves or slots provided for them within a few thousandths of an inch. Inasmuch as the phenol condensation product or Bakelite does not expand or contract under service conditions in which oil and water are used, up to a temperature of possibly 350°, a very reliable seal is effected. Another advantage is that there is no contact between the end flanges 13 and 14 and the cylinder liner, as sufficient clearance may be provided to make contact impossible whereas with certain prior cylinder assemblies in which fabric containing packing rings have been used, it has been necessary to provide a very small clearance to prevent too rapid disintegration of the fabric.

Figure 4:
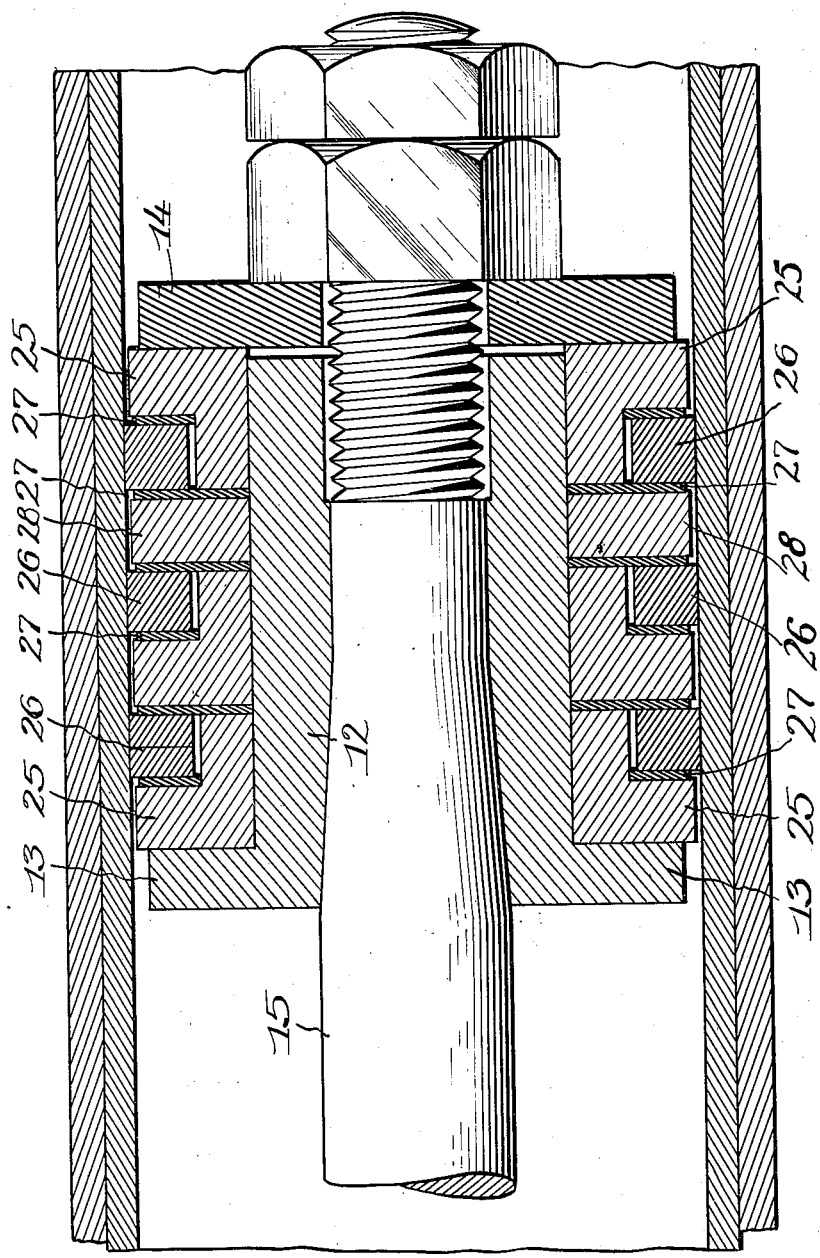
Fig. 4 is a sectional view of a modification.

In the form of the invention shown in Fig. 4, the spacing rings are formed integrally with the adjacent guide rings, resulting in a plurality of composite rings 25 which are substantially L shaped in cross section, and which may be designated either as guide rings or spacing rings, since they perform the functions of the guide rings and the spacing rings of the first form of the invention described. The sealing rings 26 and the separator rings 27, 27' are substantially the same as those described in connection with the first form of the invention. Also, a special guide ring 28, similar to those previously described in Fig. 1, may be employed. In the particular arrangement shown, the composite rings 25 on one side of said guide ring 28 face in one direction and on the other side thereof face in the opposite direction so that the outer surfaces of said composite rings engage the end flanges of the piston.

In the constructions described herein, the sealing rings polish the inner surface of the liner during long continued use instead of scoring the same, and show an exceedingly long life as compared with other combinations of elements such as used heretofore. Where steam condensate or water is involved it acts as a lubricant and prevents wear of the composition surfaces and metallic surfaces.

We claim:

1. A piston head assembly comprising a piston having end flanges one adjustable toward the other, a plurality of spaced apart guide rings on said piston between said end flanges, a plurality of spacing rings on said piston one between each two adjacent guide rings to space the same, said spacing rings having an outside diameter less than that of said guide rings to provide a series of circumferential slots, a sealing ring in each of said slots, said guide rings and said spacing rings comprising essentially a phenol condensation product with hard, smooth surfaces which polish metal areas over which they rub, and metal separators between said guide rings and said sealing rings, whereby when the assembly is clamped in place by said end flanges, said sealing rings may adjust themselves laterally between said guide rings.

2. A piston head assembly comprising a piston having end flanges one adjustable toward the other, a plurality of guide rings on said piston between said end flanges, a sealing ring between each two guide rings and of an outside diameter greater than that of said guide rings, each set of rings being made of a phenol condensation product with a smooth, hard, non-scoring surface, and a separator of a different material between the individual rings, whereby said sealing rings may adjust themselves laterally despite the clamping pressure exerted by said end flanges when the parts are in assembled position.

3. A piston head assembly comprising a piston having an elongated cylindrical surface of uniform diameter with a fixed flange at one end and a removable flange at the other end thereof, a plurality of spaced guide rings having a sliding fit over said cylindrical surface, a plurality of spacing rings alternating with said guide rings and each having a sliding fit on said cylindrical surface, said spacing rings having a radial thickness no more than half that of said guide rings, separators between said guide rings and spacing rings also having a sliding fit over said cylindrical surface and having an outside diameter slightly less than that of said guide rings, and a sealing ring surrounding each of said guide rings with a clearance between the two, said sealing rings being compressed between said separators by said removable end flange when tightened in position, certain of said rings being made of a hard, low friction material which has substantially no expansion or contraction when subjected to oil or water or to temperatures of several hundred degrees.

4. A piston head assembly comprising a piston having end flanges one adjustable toward the other, a plurality of rings on said piston, said rings having a substantially L shaped cross section providing a series of circumferential slots, a sealing ring in each of said slots composed largely of a phenol condensation product, and a guide ring between two of said rings and extending outwardly between the two adjacent sealing rings.

FRANK E. PAYNE.
THOMAS L. GATKE.